United States Patent
Motoda

(10) Patent No.: US 9,822,242 B2
(45) Date of Patent: Nov. 21, 2017

(54) COMPOSITE MATERIAL AND MOLDED GOODS COMPRISING THE SAME

(71) Applicant: 3M INNOVATIVE PROPERTIES COMPANY, St. Paul, MN (US)

(72) Inventor: Kazuomi Motoda, Tokyo (JP)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/888,288

(22) PCT Filed: Apr. 30, 2014

(86) PCT No.: PCT/US2014/036096
§ 371 (c)(1),
(2) Date: Jan. 22, 2016

(87) PCT Pub. No.: WO2014/179421
PCT Pub. Date: Nov. 6, 2014

(65) Prior Publication Data
US 2016/0145420 A1    May 26, 2016

(30) Foreign Application Priority Data
May 1, 2013    (JP) .................................. 2013-096527

(51) Int. Cl.
*C08J 9/32* (2006.01)
*C08K 7/28* (2006.01)
*C08J 5/04* (2006.01)
*C08K 7/14* (2006.01)

(52) U.S. Cl.
CPC ................ *C08K 7/28* (2013.01); *C08J 5/043* (2013.01); *C08K 7/14* (2013.01); *C08J 2323/12* (2013.01)

(58) Field of Classification Search
CPC ................................... C08K 7/28; C08K 7/14
See application file for complete search history.

(56) References Cited

U.S. PATENT DOCUMENTS

| | | | | | |
|---|---|---|---|---|---|
| 5,412,003 | A | * | 5/1995 | Akiyama | ................ C08K 7/28 428/430 |
| 5,561,169 | A | * | 10/1996 | Allen | ........................ C08J 9/32 521/51 |
| 2013/0295806 | A1 | * | 11/2013 | Imai | ........................ C08J 3/226 442/59 |

FOREIGN PATENT DOCUMENTS

| CN | 1105044 | A | 7/1995 |
|---|---|---|---|
| CN | 1110216 | A | 10/1995 |
| EP | 0449604 | | 10/1991 |
| JP | H06-256569 | A | 9/1994 |
| JP | H06-345953 | A | 12/1994 |
| JP | 2005-047970 | A | 2/2005 |
| JP | 2007-002230 | A | 1/2007 |
| JP | 2007-31611 | | 2/2007 |
| JP | 2009-029921 | | 2/2009 |
| JP | 2013-010847 | A | 1/2013 |
| WO | WO 99-15331 | | 4/1999 |

OTHER PUBLICATIONS

International Search report for PCT International Application No. PCT/US2014/036096 dated Sep. 25, 2014, 3 pages.

* cited by examiner

*Primary Examiner* — Hannah Pak
(74) *Attorney, Agent, or Firm* — Thomas M. Spielbauer

(57) ABSTRACT

Provided are composite materials that possesses an excellent flexural modulus and impact resistance, while being lightweight, and which composite material has excellent impact resistance particularly at low temperatures.

5 Claims, No Drawings

US 9,822,242 B2

COMPOSITE MATERIAL AND MOLDED GOODS COMPRISING THE SAME

CROSS REFERENCE TO RELATED APPLICATIONS

This application is a national stage filing under 35 U.S.C. 371 of PCT/US2014/036096, filed Apr. 30, 2014, which claims priority to Japanese Application No. 2013-096527, filed May 1, 2013, the disclosure of which is incorporated by reference in its/their entirety herein.

FIELD

The present description relates to a composite material and molded goods comprising the same.

SUMMARY

One objective of the present description is to provide a composite material that is lightweight (low density), while having excellent rigidity (flexural modulus) and impact resistance, which composite material has excellent impact resistance particularly at low temperatures (e.g., −15° C.).

One aspect of the present description pertains to a composite material comprising a matrix resin and glass fibers and glass bubbles dispersed in the matrix resin, wherein at least 70% of the glass fibers have a fiber length of at least 1.0 mm, and the median diameter of the glass bubbles is at least 10 μm and not more than 40 μm.

With this kind of composite material, it is possible to achieve both low density and excellent mechanical properties, such as flexural modulus and impact resistance, and particularly to yield excellent impact resistance at low temperatures (e.g., −15° C.).

In an embodiment, the mass ratio $C_B/C_F$ of the content of the glass bubbles (indicated as $C_B$ herein) to the content of the glass fibers (indicated as $C_F$ herein) may be at least 0.1 and not more than 10. A composite material of even better impact resistance at low temperatures is obtained by containing the aforementioned specific glass fibers and glass bubbles in such mass ratios.

Additionally, the content of the glass fibers in an embodiment may be at least 1% by mass and not more than 40% by mass based on the total quantity of the composite material. Also, the content of the glass bubbles in an embodiment may be at least 1% by mass and not more than 30% by mass based on the total quantity of the composite material. Even greater improvements in weight savings and mechanical properties are realized with these composite materials.

Also, the 90%-volume residual compressive strength of the glass bubbles in an embodiment may be 50 MPa or greater. This kind of glass bubble can more certainly realize improvements in both weight savings and mechanical properties.

Additionally, the true density of the glass bubbles in an embodiment may be at least 0.3 g/cm$^3$ and less than 0.9 g/cm$^3$. Such glass bubbles can achieve even greater weight savings in the composite material.

Also, the composite material in an embodiment may be obtained by melt-kneading resin pellets, in which fiber bundles of glass fibers are impregnated with a base resin, with a resin material containing glass bubbles. Such melt-kneading can disperse the glass fibers into the composite material with the fiber length thereof maintained. Thus, a composite material obtained in this manner yields even more excellent mechanical properties (particularly impact resistance at low temperatures).

Also, in an embodiment, the composite material may also be made by injection molding a melt-kneaded material of the resin pellets and the resin material. Such injection molding can easily mold composite material in a state in which large quantities of glass fibers with long fiber length are dispersed in the composite material. Therefore, composite material obtained in this manner can be molded in a desired shape and can have even more excellent mechanical properties (particularly impact resistance at low temperatures).

Another aspect of the present description relates to molded goods that contain the composite material. The molded good related to the present description provides for weight savings by using the composite material, and has excellent mechanical properties. Additionally, since the molded good uses the composite material having excellent impact resistance at low temperatures, it can be appropriately used in applications that presume use in low-temperature environments, such as in automotive components.

Accordingly, the present description provides a composite material that can be molded into molded goods having excellent flexural modulus and impact resistance (particularly impact resistance at low temperatures), while being lightweight (low density).

DETAILED DESCRIPTION

The composite material of one embodiment of the present description comprises a matrix resin and glass fibers and glass bubbles that are dispersed in the matrix resin. Additionally, in this composite material, at least 70% of the glass fibers have a fiber length of at least 1.0 mm, and the median diameter of the glass bubbles is at least 10 μm and not more than 40 μm.

Because these kinds of specific glass fibers and glass bubbles are dispersed in the matrix resin, the composite material of this embodiment has excellent mechanical properties (e.g., bending strength, flexural modulus, tensile strength, and impact resistance), while being lightweight. In particular, the composite material of this embodiment has excellent impact resistance at low temperatures (e.g., −15° C.), and can be appropriately used in applications that presume use in low-temperature environments, such as in automotive components.

It is common in composite materials to disperse glass fibers and glass bubbles into a matrix resin by performing an operation, such as kneading, when manufacturing the composite materials, but with conventional methods, the glass fibers are broken during kneading so that the fiber length becomes markedly shorter than before kneading. In contrast, in this embodiment, the composite material is manufactured by a specific melt-kneading described below, so that the fiber length of at least 70% of the glass fibers is 1.0 mm or greater.

In addition, by conventional methods, it is thought that the fiber pieces from the glass fibers breaking during kneading come in contact with the glass bubbles and rupture the glass bubbles. In contrast, in the present embodiment, since the breakage of glass fibers is inhibited compared with conventional methods, it is thought that the breakage of the glass bubbles is also inhibited.

Thus, the composite material of this embodiment was manufactured so that at least 70% of the glass fibers therein have a fiber length of 1.0 mm or greater, and the composite material has glass bubbles whose median diameter is at least 10 μm and not more than 40 μm. Thus, equipped with these features, the composite material of this embodiment has the excellent effect of achieving improvements in both weight savings and mechanical properties (particularly improved impact resistance at low temperatures).

The various ingredients comprising the composite material of this embodiment will be described in detail below.

The matrix resin is the base material supporting the glass fibers and glass bubbles. The matrix resin can be appropriately selected from various resins according to the application of the composite material.

From the perspective of facilitating the dispersion of glass fibers and glass bubbles through melt-kneading, it is preferable that the matrix resin is a thermoplastic resin.

Examples of preferred matrix resins include polyolefin resins (e.g., high-density polyethylene resin (HDPE), low-density polyethylene resin (LDPE), linear low-density polyethylene resin (LLDPE), polypropylene resin (PP)), polyolefin copolymer resins (e.g., ethylene-butene resin, ethylene-octene resin, ethylene vinyl alcohol resin), polystyrene resins, polystyrene copolymer resins (e.g., impact resistant polystyrene resin, acrylonitrile butadiene styrene copolymer resin), polyacrylate resins, polymethacrylate resins, polyester resins, polyvinyl chloride resins (PVC), fluoropolymer resins, liquid crystal polymer resins, polyamide resins, polyether imide resins, polyphenylene sulfide resins, polysulfone resins, polyacetal resins, polycarbonate resins, polyphenylene oxide resins, polyurethane resins, thermoplastic elastomer resins, epoxy resins, alkyd resins, melamine resins, phenol resins, urea resins, and vinylester resins. Additionally, the matrix resin may use any one of the above types or may use a combination of two or more.

The matrix resin preferably includes a polypropylene resin.

The content of matrix resin is preferably 50 to 95% by mass, more preferably 55 to 91% by mass, based on the total quantity of composite material.

The glass fiber is glass that has been melted, drawn, and formed into a fiber shape. In this embodiment, at least 70% (preferably at least 74%) of the glass fibers contained in the composite material have a fiber length of 1.0 mm or greater.

As described above, some or all of the glass fibers in the composite material commonly are broken when the glass fibers are dispersed in the matrix resin, shortening the fiber length thereof prior to being admixed. By adjusting the degree of breakage so that the glass fibers with a fiber length of 1.0 mm or greater comprise at least 70% of all the glass fibers, in combination with the glass bubbles having the specific median diameter, this embodiment can have the excellent effects described above.

The proportion of glass fibers with a fiber length of 1.0 mm or greater relative to all glass fibers (fiber count percentage) can be measured by the following method. First, a test piece made from composite material is burned, and the glass fibers and glass bubbles are collected as ash. Next, approximately 1 g of this ash is added to about 300 mL of water and subjected to ultrasonic dispersion. Because of the difference in density, this ultrasonic dispersion causes the glass fibers to precipitate and causes the glass bubbles to float to the surface of the water, where only the glass bubbles are removed. After the glass bubbles have been removed by repeating this operation multiple times, a set quantity of glass fibers is moved to a slide glass and dried. After drying, the length of the glass fibers is measured by digital microscopic observation, whereby the percentage of glass fibers with fiber length of 1.0 mm or greater can be found (e.g., the number of glass fibers with fiber length of 1.0 mm or greater out of 100 glass fibers can be taken as the proportion (%) of glass fibers with fiber length of 1.0 mm or greater).

It is also preferable that at least 50% of the glass fibers have a fiber length of 1.5 mm or greater. The proportion of glass fibers with fiber length of 1.5 mm or greater relative to all glass fibers is preferably 50% or greater.

The upper limit of the fiber length of glass fibers in the composite material is not particularly limited, but it may be, for example, 8 mm or less. Further, the upper limit of the fiber length of glass fibers in the composite material may be the fiber length of the glass fibers prior to admixture.

The fiber diameter of the glass fibers may be, for example, 5 μm or greater, or may be 10 μm or greater. Additionally the fiber diameter of the glass fibers may be, for example, 30 μm or less, or may be 20 μm or less.

The content of glass fibers preferably is at least 1% by mass, more preferably at least 2% by mass, and still more preferably at least 3% by mass, based on the total quantity of composite material. Additionally, the content of glass fibers preferably is not more than 40% by mass, more preferably not more than 35% by mass, and still more preferably not more than 30% by mass, based on the total quantity of composite material. Sufficient mechanical properties can be reliably obtained by having the content of glass fibers be at least 1% by mass. Also sufficient weight saving effect can be more reliably obtained and excellent moldability can be maintained by having the glass fiber content be not more than 40% by mass. In other words, having the glass fiber content within the aforementioned range achieves even greater improvements in weight savings and mechanical properties.

The glass bubbles are hollow, spherical glass particles. Because the glass bubbles have low density, the density of the composite material can be reduced and it can be made more lightweight.

The median diameter of the glass bubbles is at least 10 μm and not more than 40 μm. This kind of glass bubble, in combination with the specific glass fibers described above, makes it possible to obtain the excellent effects described above.

The median diameter of the glass bubbles preferably is at least 10 μm, and more preferably at least 15 μm. Additionally, the median diameter of the glass bubbles preferably is not more than 50 μm, and more preferably not more than 30 μm.

Further, in the present specification, the median diameter refers to the particle diameter at which, when the glass bubbles are divided into two by the particle diameter thereof, the glass bubbles whose particle diameter is less than this particle diameter is volumetrically equal to the glass bubbles whose particle diameter is greater than this particle diameter. The median diameter of the glass bubblescan be measured by, e.g., a Partica LA-950V2 laser diffraction/scattering particle diameter distribution measuring device (Horiba, Ltd. (Kyoto-fu, Kyoto-shi).

The 90%-volume residual compressive strength of the glass bubbles is preferably 50 MPa or greater, and more preferably 100 MPa or greater. If the 90%-volume residual compressive strength is less than 50 MPa, there is a tendency for the glass bubbles to be susceptible to rupture during melt-kneading. If the 90%-volume residual compressive strength is 50 MPa or greater, rupturing of the glass bubbles can be sufficiently inhibited in kneading during production such that at least 70% of the glass fibers have a fiber length of 1.0 mm or greater, realizing even more pronounced weight savings in the composite material.

Additionally the 90%-volume residual compressive strength of the glass bubbles is preferably not more than 300 MPa, and even more preferably not more than 200 MPa. If the 90% residual compressive strength exceeds 300 MPa, there are cases in which the weight savings effect is not sufficiently yielded due to the increased glass thickness of the glass bubbles. Additionally, rupturing of the glass bubbles in kneading during production can be sufficiently inhibited in the composite material of this embodiment even when the 90%-volume residual compressive strength is 300 MPa or less.

Further, the 90%-volume residual compressive strength of the glass bubbles in this specification is a value obtained by measurement using glycerol, in compliance with ASTMD 3102-78 (1982 edition). More concretely, measurement samples are prepared by mixing a specified quantity of glass bubbles with glycerol and sealing it so that air does not infiltrate, which measurement sample is then set in a test chamber. Next, the volume change in the glass bubbles in the measurement sample is observed while gradually increasing the pressure, and then measuring the pressure when the residual volume of glass bubbles in the measurement sample reaches 90% volume (when 10% by volume have ruptured), which pressure is taken as the 90%-volume residual compressive strength.

The true density of the glass bubbles preferably is at least 0.3 g/cm$^3$, and more preferably is 0.4 g/cm$^3$. When the true density of the glass bubbles is at least 0.3 g/cm$^3$, the glass bubbles are more difficult to rupture, making it easier to yield the appropriate compressive strength described above. Additionally, it is preferable that the true density of the glass bubbles is less than 0.9 g/cm$^3$, and more preferably not more than 0.6 g/cm$^3$, in order to more effectively yield the weight savings effect.

Further, the true density of the glass bubbles in this specification is the true density measured according to the ASTMD 2856-94: 1998 edition, and can be measured using, for example, an Accupyc II 1340 dry, automated true densitometer (Shimadzu Corp. (Kyoto-fu, Kyoto-shi).

The content of glass bubbles is preferably at least 1% by mass, more preferably at least 2% by mass, and even more preferably at least 3% by mass, based on the total quantity of composite material. Additionally, the content of glass bubbles is preferably not more than 40% by mass, more preferably not more than 30% by mass, and even more preferably not more than 15% by mass, based on the total quantity of composite material. Sufficient weight saving effect can be reliably obtained by having the content of glass bubbles be at least 1% by mass. Additionally, having the content of glass bubbles be not more than 40% by mass inhibits rupturing of the glass bubbles, for instance due to impact between the glass bubbles, making it possible to more effectively obtain the technical effects described herein, and to realize even better quality molded goods.

It is preferable here that the mass ratio $C_B/C_F$ of the content of the glass bubbles $C_B$ to the content of the glass fibers $C_F$ is at least 0.1 and not more than 10. Composite materials of even better impact resistance at low temperatures are obtained by containing the aforementioned specific glass fibers and glass bubbles at such mass ratios. The ratio $C_B/C_F$ is preferably 0.2 or greater, and more preferably 0.5 or greater. Additionally, the ratio $C_B/C_F$ is preferably 8 or less, and more preferably 4 or less. Thus, the above effects can be even more markedly achieved.

The composite material of this embodiment can be obtained by, for example, melt-kneading resin pellets in which fiber bundles of glass fibers are impregnated with a base resin and a resin material containing glass bubbles. This kind of melt-kneading makes it possible to disperse glass fibers into the composite material while maintaining the long fiber length thereof. Thus, even better mechanical properties (particularly impact strength at low temperatures) are obtained with composite materials obtained in this manner.

The resin pellets here can be obtained by, for example, impregnating a continuous glass fiber bundle with a base resin, and cutting it perpendicular to the fiber direction at desired lengths, while drawing the glass fiber bundle. Resin pellets obtained in this manner can have a structure in which a fiber bundle made from a multiplicity of glass fibers with roughly the same fiber length (the aforementioned desired length when cut) has been impregnated with a base resin.

The base resin is not specifically limited as long as it can be melt-kneaded with a resin material, and, for example, resins similar to the matrix resin described above can be used.

Additionally, the composite material of this embodiment may be one that is obtained by extrusion molding the product of melt-kneading resin pellets and a resin material. This kind of extrusion molding makes it possible to easily mold a composite material in a state in which a large quantity of glass fibers with long fiber length are dispersed in the composite material. Therefore, composite material obtained in this manner can be molded in a desired shape and can have even more excellent mechanical properties (particularly impact resistance at low temperatures).

The conditions of melt-kneading and extrusion molding of the resin pellets and resin material can be appropriately adjusted so that at least 70% of the glass fibers in the resulting composite material have a fiber length of 1.0 mm or greater.

Melt-kneading and extrusion molding can be performed using, for example, commonly known extrusion molding machines (e.g., FNX140 made by Nissei Plastic Industrial Co., Ltd. (Nagano-ken, Hanishina-gun, Sakaki-machi)). Additionally, for example, when the matrix resin is a polypropylene resin, those conditions can be approximately 230° C. cylinder temperature, approximately 230° C. resin temperature, approximately 50° C. die temperature, approximately 10 mm/s filling speed, and approximately 80 rpm screw speed.

The resin material in this embodiment is low density, with excellent bending strength, flexural modulus, tensile strength, and impact resistance (particularly impact resistance at low temperatures). Therefore, the resin material of this embodiment can be widely used in applications that demand a good balance of low density, strength, and impact property.

The resin material of this embodiment can be appropriately used in applications such as automotive components, household electrical goods, daily commodities, home appliances, containers, pallets, vessels, and the like, and can be particularly appropriately use used for automotive components.

Examples of automotive components are engine parts, chassis parts, exterior and auto body parts, and interior parts.

In other words, the resin material of this embodiment can be used, for example, as an engine part in air ducts, resonators, air cleaner cases, belt covers, engine covers, engine under covers, and the like.

The resin material of this embodiment can also be used, for example, as a chassis part in brake master cylinders, and the like.

The resin material of this embodiment can also be used, for example, as exterior and auto body parts in bumpers, side guard molding, headlamp housings, mud guards, fender protectors, window washer tanks, sill spoilers, air conditioner cases, air conditioner ducts, motor fans, fan shrouds, kick plates, front end modules, back door interiors, and the like.

The resin material of this embodiment can also be used, for example, as an interior part in instrument panels, console boxes, glove boxes, door trim, pillar trim, column shift covers, meter housings, trunk trim, sun visors, battery cases, and the like.

A molded good of one embodiment comprises the composite material. Because such molded good utilizes one of the aforementioned composite materials, the molded good allows for weight savings and has excellent mechanical properties. Additionally, because the composite material of this molded good has particularly good impact resistance at low temperatures, the molded good can be appropriately used in applications that presume use in a low-temperature environment, such as in automotive parts, and the like.

The molded good of this embodiment can be appropriately used as the aforementioned automotive components, household electrical goods, daily commodities, home appliances, containers, pallets, vessels, and the like.

Suitable embodiments were described above, but the present application is not limited to the aforementioned embodiments.

For example, one aspect of the present application is a method of improving the impact resistance at low temperature of the composite material in which at least 70% of the glass fibers have a fiber length of 1.0 mm or greater.

Another aspect of the present application is manufactured material of a composite material melt-kneaded so that at least 70% of the glass fibers have a fiber length of 1.0 mm or greater.

EXAMPLES

The materials in the working examples and comparative examples were acquired by the methods shown below.

Polypropylene (block copolymer) (1,326 MPa flexural modulus, 8.8 kJ/m$^2$ (23° C.) Charpy impact strength, 0.9 g/cm$^3$ density) was acquired as component A from Sumitomo Chemical Co., Ltd. (Tokyo, Chuo-ku) (product name: AZ864).

A composite material made by melt-kneading the polypropylene component A with glass bubbles of component G (density 0.7 g/cm$^3$), described below, was produced as component B.

A composite material of polypropylene (block copolymer) and glass fibers (60% by mass glass fibers, 6 mm cut length, ten-odd μm filament diameter, continuous fibers (roving)) were acquired as component C from Owens Corning Japan LLC (Tokyo, Minato-ku) (product name: LP6010-L8).

A composite material made by melt-kneading the polypropylene component A with glass fibers of component F, described below, was produced as component D.

A composite material of polypropylene (block copolymer) and glass fibers (30% by mass glass fibers, 0.3 mm cut length, ten-odd μm filament diameter) were acquired as component E from Prime Polymer Co., Ltd. (Tokyo, Minato-ku) (product name: Prime Polypro R-350G).

Glass fibers (3 mm cut length, 10 μm filament diameter, glass chopped strands) were acquired as component F from Nitto Boseki Co., Ltd. (Fukuoka-ken, Fukuoka-shi).

Glass bubbles (0.46 g/cm$^3$ true density, 110 MPa 90%-volume residual compressive strength, 20 μm median diameter) were acquired as component G from Sumitomo-3M (Kanagawa-ken, Sagamihara-shi) (product name: 3M™ Glass Bubbles iM16K).

Examples 1 Through 8, Comparative Examples 1 Through 3, Reference Example 1

Pellets of Components A through E were uniformly dry-blended at the mixture ratios (% by mass) listed in Table 1 and Table 2 and were thereafter charged into an extrusion molding machine (FNX140; made by Nissei Plastic Industrial Co., Ltd. (Nagano-ken, Hanishina-gun, Sakaki-machi)) and melt-kneaded and extrusion molded under the conditions below to prepare test pieces made from composite materials. The following methods were used to measure the percentages of glass fibers with fiber lengths of at least 1.0 mm, at least 1.5 mm, and at least 2.0 mm relative to all glass fibers, density, bending strength, flexural modulus, tensile strength, impact resistance at room temperature (23° C.), and impact resistance at low temperature (−15° C.) of the resulting test pieces. The results obtained are shown in Table 3 and Table 4.

Test Piece Preparation Method

An extrusion molding machine (FNX140; made by Nissei Plastic Industrial Co., Ltd. (Nagano-ken, Hanishina-gun, Sakaki-machi)) was used to perform melt-kneading and extrusion molding at 230° C. cylinder temperature, 230° C. resin temperature, 53° C. die temperature, 10 mm/s filling speed, and 80 rpm screw speed according to the molding conditions stipulated in ISO 0294-1: 1996 edition, to prepare type A1, 4-mm thick multipurpose test pieces according to ISO 3167: 1993 edition.

Measuring Fiber Length of Glass Fibers

After burning the test piece at 550° C. for 3 hours, the glass fibers and glass bubbles were collected as ash. Approximately 1 g of this ash was added to about 300 of mL water and subjected to ultrasonic dispersion to separate the glass fibers and glass bubbles. Because of the difference in density, the glass fibers precipitated and the glass bubbles floated to the surface of the water, where only the glass bubbles were removed. Additional water was then added and again subjected to ultrasonic dispersion and only the glass bubbles were removed, which was then repeated several times until glass bubbles no longer appeared at the water surface. A set quantity of water with glass fibers dispersed therein was then transferred to a slide glass and dried until the water content evaporated. The resulting sample was observed under a digital microscope at 30 times magnification and the residual length of 100 randomly selected glass fibers was measured. The numbers of glass fibers out of the 100 glass fibers whose fiber lengths were 1.0 mm or greater, 1.5 mm or greater, and 2.0 mm or greater were found and expressed as %.

Measuring Density

The density of the test pieces was measured according to ISO 1183: 1987 edition.

Measuring Bending Strength

The bending strength of the test pieces was measured according to ISO 178: 2003 edition.

Measuring Flexural Modulus

The flexural modulus of the test pieces was measured according to ISO 178: 2003 edition.

Measuring Tensile Strength

The tensile strength of the test pieces was measured according to ISO 527-1 and ISO 527-2: 1993 edition.

Measuring Impact Strength at Room Temperature (23° C.)

The Charpy impact strength of the test pieces at 23° C. was measured at 1 eA (type A notch) according to ISO 179: 2010 edition.

Measuring Impact Strength at Low Temperature (−15° C.)

The Charpy impact strength of the test pieces at −15° C. was measured at 1 eA (type A notch) according to ISO 179: 2010 edition.

TABLE 1

| Component (% by mass) | Example 1 | Example 2 | Example 3 | Example 4 | Example 5 | Example 6 | Example 7 | Example 8 |
|---|---|---|---|---|---|---|---|---|
| A | 80 | 70 | 75 | 46.67 | 65 | 60 | 55 | — |
| B | 10 | 10 | 20 | 20 | 30 | 30 | 40 | 50 |
| C | 10 | 20 | 5 | 33.33 | 5 | 10 | 5 | 50 |
| D | — | — | — | — | — | — | — | — |
| E | — | — | — | — | — | — | — | — |
| Total | 100 | 100 | 100 | 100 | 100 | 100 | 100 | 100 |

TABLE 2

| Component (% by mass) | Comparative Example 1 | Comparative Example 2 | Comparative Example 3 | Reference Example 1 |
|---|---|---|---|---|
| A | 60 | 70 | 60 | 100 |
| B | 20 | 20 | 30 | — |
| C | — | — | — | — |
| D | — | 10 | 10 | — |
| E | 20 | — | — | — |
| Total | 100 | 100 | 100 | 100 |

TABLE 3

| | Example 1 | Example 2 | Example 3 | Example 4 | Example 5 | Example 6 | Example 7 | Example 8 |
|---|---|---|---|---|---|---|---|---|
| Glass bubble content (% by mass) | 3 | 3 | 6 | 6 | 9 | 9 | 12 | 15 |
| Glass fiber content (% by mass) | 6 | 12 | 3 | 20 | 3 | 6 | 3 | 30 |
| Density (g/cm$^3$) | 0.92 | 0.95 | 0.88 | 0.99 | 0.85 | 0.88 | 0.83 | 1.00 |
| Bending strength (MPa) | 69.9 | 98.8 | 57.1 | 112.8 | 52.1 | 71.8 | 47.7 | 126.0 |
| Flexural modulus (MPa) | 2322 | 3290 | 1929 | 4728 | 2030 | 2588 | 2087 | 7246 |
| Tensile strength (MPa) | 52.4 | 73.2 | 38.5 | 83.6 | 32.9 | 49.6 | 32.3 | 88.9 |
| Charpy impact strength (23° C., kJ/m$^2$) | 10.6 | 15.3 | 7.0 | 18.5 | 6.5 | 10.0 | 6.1 | 16.2 |
| Charpy impact strength (−15° C., kJ/m$^2$) | 11.2 | 17.2 | 7.6 | 24.0 | 8.3 | 13.4 | 7.9 | 20.8 |
| Specific rigidity Flexural modulus$^{1/3}$/Density (MPa$^{1/3}$)/g/cm$^3$ | 14.5 | 15.6 | 14.2 | 17.0 | 14.8 | 15.6 | 15.3 | 19.4 |
| Proportion of glass fiber (%) 1.0 mm or | 96 | 86 | 95 | 92 | 97 | 97 | 99 | 74 |
| 1.5 mm or | 87 | 56 | 77 | 84 | 79 | 78 | 85 | 51 |
| 2.0 mm or | 68 | 30 | 62 | 64 | 70 | 58 | 76 | 23 |

TABLE 4

| | Comparative Example 1 | Comparative Example 2 | Comparative Example 3 | Reference Example 1 |
|---|---|---|---|---|
| Glass bubble content (% by mass) | 6 | 6 | 9 | — |
| Glass fiber content (% by mass) | 6 | 3 | 3 | — |
| Density (g/cm$^3$) | 0.89 | 0.87 | 0.85 | 0.9 |
| Bending strength (MPa) | 51.4 | 36.0 | 33.7 | 37 |
| Flexural modulus (MPa) | 2284 | 1755 | 1814 | 1326 |
| Tensile strength (MPa) | 34.2 | 23.2 | 21.2 | 24 |
| Charpy impact strength (23° C., kJ/m$^2$) | 3.4 | 2.3 | 2.0 | 8.8 |
| Charpy impact strength (−15° C., kJ/m$^2$) | 2.1 | 1.9 | 1.3 | 4.4 |
| Specific rigidity Flexural modulus$^{1/3}$/Density (MPa$^{1/3}$)/g/cm$^3$ | 14.7 | 13.9 | 14.4 | 12.2 |
| Proportion of glass fiber (%) 1.0 mm or greater | 1 | 2 | 1 | — |
| 1.5 mm or greater | 0 | 0 | 0 | — |
| 2.0 mm or greater | 0 | 0 | 0 | — |

The invention claimed is:

1. A composite material comprising from 55 to 91% by mass based on the total mass of the composite material of a polypropylene matrix resin, and glass fibers and glass bubbles dispersed in the matrix resin;
   at least 70% of the glass fibers having a fiber length of 1.0 mm or greater, and
   a median diameter of the glass bubbles being at least 10 µm and not more than 40 µm,
   wherein a 90%-volume residual compressive strength of the glass bubbles is at least 50 MPa.

2. The composite material according to claim 1, having a content of the glass bubbles $C_B$ and a content of the glass fibers $C_F$, wherein a mass ratio $C_B/C_F$ of is at least 0.1 and not more than 10.

3. The composite material according to claim 1, wherein a content of the glass fibers is at least 1% by mass and not more than 40% by mass based on a total quantity of the composite material.

4. The composite material according to claim 1, wherein a content of the glass bubbles is at least 1% by mass and not more than 30% by mass based on a total quantity of the composite material.

5. The composite material according to claim 1, wherein a true density of the glass bubbles is at least 0.3 g/cm³ and less than 0.9 g/cm³.

* * * * *

UNITED STATES PATENT AND TRADEMARK OFFICE
CERTIFICATE OF CORRECTION

PATENT NO. : 9,822,242 B2
APPLICATION NO. : 14/888288
DATED : November 21, 2017
INVENTOR(S) : Kazuomi Motoda Page 1 of 1

It is certified that error appears in the above-identified patent and that said Letters Patent is hereby corrected as shown below:

In the Claims

Column 11
Line 14, Claim 2, Delete "of".

Signed and Sealed this
Sixteenth Day of October, 2018

Andrei Iancu
*Director of the United States Patent and Trademark Office*